UNITED STATES PATENT OFFICE.

FREDERICK DURRANT, OF AMY, MICHIGAN, ASSIGNOR OF ONE-HALF TO FREDERICK W. DURRANT, OF SAME PLACE.

WELDING COMPOUND.

SPECIFICATION forming part of Letters Patent No. 440,946, dated November 18, 1890.

Application filed August 7, 1890. Serial No. 361,386. (No specimens.)

*To all whom it may concern:*

Be it known that I, FREDERICK DURRANT, a citizen of the United States, residing at Amy, in the county of Oakland and State of Michigan, have invented certain new and useful Improvements in Welding Compounds, of which the following is a specification.

This invention relates to new and useful improvements in welding compounds; and the invention consists in the peculiar combination of the elements whereby the most efficient flux is formed.

To this end my compound consists of the following elements in the following proportions: I take eight ounces of borax, four ounces of brick-dust or marble-dust, and one-half ounce each of salts of tartar and bicarbonate of potassium, each being previously ground to a powder, and mix the whole, stirring them thoroughly. The borax effects the well-known result of preventing the oxidation of the metal, the salts of tartar tends to reduce any oxidation which may have been formed, while the bicarbonate of potassium gives off carbonic-acid gas, forming small bubbles in the flux and preventing contact of the air with the heated metal. The brick-dust or marble-dust gives a body to the compound, and also adds to the body of the flux, making it more viscous.

What I claim as my invention is—

The herein-described compound for welding, consisting of borax, brick or marble dust, bicarbonate of potassium, and salts of tartar, in the proportions herein described.

In testimony whereof I affix my signature in presence of two witnesses.

FREDERICK DURRANT.

Witnesses:
 M. B. O'DOGHERTY,
 P. M. HULBERT.